June 26, 1956
L. L. FOUNTAIN
2,752,535
CIRCUIT BREAKER CONTROL SYSTEM
Filed Aug. 30, 1952
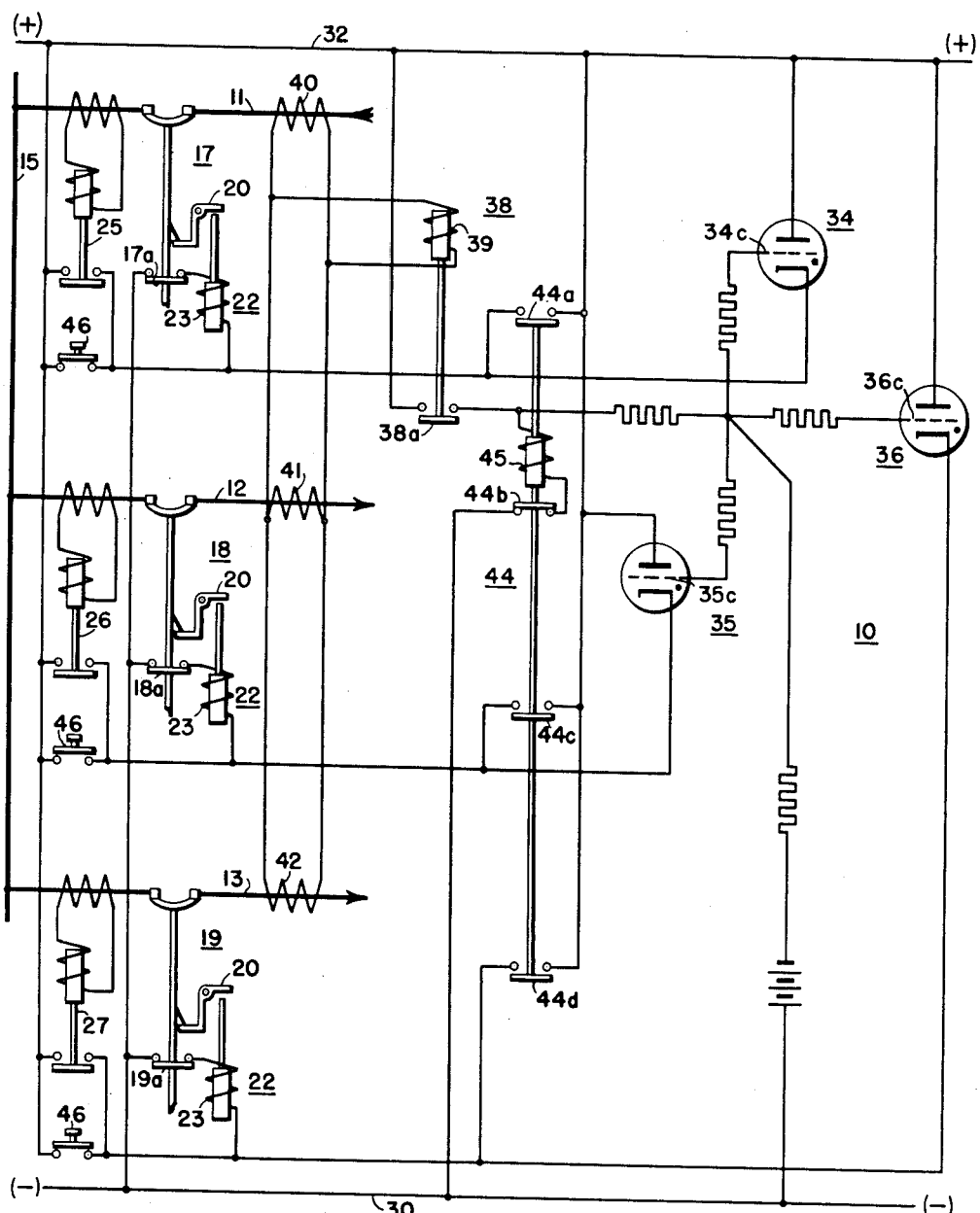
WITNESSES:
John E. Hensley
F. V. Giolma
INVENTOR
Lawrence L. Fountain.
BY
Ralph L. Swingle
ATTORNEY

United States Patent Office 2,752,535
Patented June 26, 1956

2,752,535

CIRCUIT BREAKER CONTROL SYSTEM

Lawrence L. Fountain, Pittsburgh, Pa., assignor to Westinghouse Electric Corporation, East Pittsburgh, Pa., a corporation of Pennsylvania Application August 30, 1952, Serial No. 307,208

7 Claims. (Cl. 317—46)

My invention relates generally to circuit interrupters and has reference in particular to control systems for circuit breakers.

Generally stated, it is an object of my invention to provide a novel circuit breaker tripping system.

More specifically, it is an object of my invention to provide for using quick-response electronic tube trip circuits for a plurality of circuit breakers.

Yet another object of my invention is to provide each of a plurality of circuit breakers with an individual gaseous discharge device for energizing the trip device thereof and for controlling the discharge devices by means of a common fault responsive relay which also effects operation of a common master relay, providing trip circuits for the several trip devices as a means of back-up protection.

It is an important object of my invention to provide in a bus and feeder system for using a differential relay to control the grid circuits of a plurality of gaseous discharge devices to simultaneously effect high-speed tripping of the several feeder breakers and for also using the differential relay to effect operation of a master relay which affords back-up protection in the event of failure of a gaseous discharge device.

Other objects will in part be obvious, and will in part be explained hereinafter.

In practicing my invention in accordance with one of its embodiments, high-speed tripping of a plurality of circuit breakers connecting incoming and outgoing feeders to a station bus may be effected by utilizing gaseous discharge devices to individually energize the trip devices of each of the breakers in response to operation of a protective relay responsive to a differential between the currents of the incoming and outgoing buses. A master relay controlled by the protective relay provides back-up protection in the event that a discharge device should fail by completing parallel trip circuits for the trip devices. The circuit breakers interrupt their own trip circuits through auxiliary contacts when they open so as to prevent multiple energizations of the trip devices.

For a more complete understanding of the nature and scope of my invention, reference may be made to the following detailed description, which may be read in connection with the accompanying drawing in which the single figure is a diagrammatic view of a feeder system embodying the invention in one of its forms.

Referring to the drawing, the reference numeral 10 may denote generally a station bus and feeder system wherein a plurality of feeders 11, 12 and 13 are connected to a common bus 15 by means of circuit breakers 17, 18 and 19, respectively. The circuit breakers may be of any suitable type and are shown for purposes of illustration as being maintained in the closed position by means of latches 20 disposed to be released by means of trip devices 22 having operating windings 23.

Tripping of the circuit breakers 17, 18 and 19 may be effected individually by means of overcurrent relays 25, 26 and 27 which may be arranged to connect the operating windings 23 of their respective trip devices between the conductors 30 and 32 of a source of control voltage.

In order to provide for effecting high speed tripping of the circuit breakers 17, 18 and 19 in the event of a bus fault, electric discharge devices 34, 35 and 36 of the gaseous electron tube type, commonly called thyratrons, may be provided for individually connecting the trip devices 22 of the several circuit breakers to the source of control voltage. Operation of the discharge devices may be effected by connecting the control electrodes 34c, 35c and 36c to the positive side of the control source by means of a protective relay 38 to render the devices conductive. The protective relay 38 may have an operating winding 39 which is connected to be energized in accordance with a differential between the current of the incoming feeder 11 which supplies electrical energy to the station bus 15 and the currents of the outgoing feeders 12 and 13. While only a single incoming feeder is shown for purposes of illustration, it is realized that a plurality of incoming feeders may be used with either a plurality of outgoing feeders or possibly a single outgoing feeder.

Likewise, while an isolated section of a station bus is shown, it will be realized that a differential protective system may also be used in the event that a tie breaker is used to connect the station bus 15 to another section of station bus. In the present instance, current transformers 40, 41 and 42 associated with the feeders 11, 12 and 13 are connected in parallel circuit relation with the operating winding 39 of the differential protective relay 38 so as to effect operation of the protective relay in the event that there is a differential between the current of the feeder 11 and the sum of the currents of the feeders 12 and 13.

In order to provide back-up protection in the event that one of the gaseous discharge devices should fail, a master relay 44 having an operating winding 45 may be utilized simultaneously to connect the operating windings 23 of the several trip devices 22 to the source of control voltage. The operating winding 45 may, for example, be connected to the source of control voltage through contact 38a of the protective relay 38 in series with a normally closed contact 44b of the master relay which operates to interrupt its own energizing circuit.

Manual tripping of the several circuit breakers may be effected by means of switches represented by the push button switches 46. In order to prevent multiple or duplicate energizations of the several trip devices, the trip circuits thereof may be completed through auxiliary contacts of their respective circuit breakers, so that the trip circuits are interrupted as soon as the circuit breakers operate in response to any one of the several control devices.

In operation, the differential relay 38 will operate whenever there is a differential between the current of the feeder 11 and the currents of the feeders 12 and 13. This connects the control electrodes of the gaseous discharge devices 34, 35 and 36 to the positive conductor 32 through contact member 38a. The discharge devices are thereupon rendered conductive and individually provide obvious energizing circuits for their respective trip devices 22 by connecting them to the positive conductor 32.

At the same time that the control electrodes of the discharge devices are connected to the positive conductor, an energizing circuit is completed for the somewhat slower-operating master relay 44. This relay thereupon operates to the energized position momentarily closing contacts 44a, 44c and 44d. This will provide an energizing circuit for the respective trip devices 22 only in the event that their associated circuit breaker has not already been tripped. If the circuit breaker is tripped by its respective gaseous discharge device as will normally be the case, the trip circuit for its trip device 22 will be interrupted at the auxiliary contacts 17a, 18a and 19a of the respective circuit breakers.

From the above description and the accompanying drawing, it will be apparent that I have provided an improved control system for circuit breakers. This is especially true of a bus differential relay protective system which requires an auxiliary or master relay to trip a multiplicity of breakers at the same time. The use of this auxiliary relay is usually required because the differential protective relay contacts are unable to carry the high current resulting from a number of trip coils in parallel. Such a relay usually requires from 1½ to 3 cycles to operate, and this is a relatively high percentage of the overall tripping time of both the breakers and relays when it is considered that most circuit breakers used in such service have tripping times of no more than from 2 to 3 cycles. By using gaseous discharge devices, which are operated individually from the differential protective relay and are rendered conductive on the order of microseconds, the overall tripping time of the system may be greatly reduced. The small current supplied to the grid of each discharge device permits the protective relay to trip a large number of breakers simultaneously without becoming overloaded. In addition, the trip circuits remain independent of each other, thus permitting manual tripping and tripping by means of individual protective relays for the respective circuit breakers. The reliability of the system is greatly enhanced by reason of the back-up protection afforded by the common master relay.

Since certain changes may be made in the above described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. In a control system for a plurality of circuit breakers each having a trip mechanism with a trip coil for operating the mechanism to open the breaker, a fault responsive relay having normally open contacts, a master relay having contacts, circuit means including the contacts of the fault responsive relay connecting the master relay to make it operable in response to operation of the fault responsive relay to simultaneously provide energizing circuits for the trip coils of the several circuit breakers, means including a hot cathode gaseous discharge device connecting each trip coil to a source of electrical energy when conductive, circuit means including contacts of the fault responsive relay connecting the discharge devices to render them conductive in response to operation of the fault responsive relay and independently of the master relay, and contact means connected in circuit with each trip coil to interrupt the energizing circuit thereof when its circuit breaker opens.

2. In combination, a circuit breaker having a trip mechanism with a trip coil for operating it to open the breaker and auxiliary contacts which open when the breaker opens, a relay having contacts operable to provide an energizing circuit for the trip coil, a hot cathode gaseous discharge device operable to provide a separate and distinct energizing circuit for the trip coil, and fault means operable to connect said relay and said discharge device to effect operation thereof.

3. In combination, a plurality of circuit breakers connecting feeders to a bus, trip means individual to each breaker for opening said breaker, means individually operating the trip means including an electric discharge device connected directly in circuit with a source and one of said trip means, a master relay having contacts connected in circuit with the trip means to simultaneously operate the trip means, means producing a control voltage proportional to the currents in the feeders, a differential relay, circuit means connecting the differential relay to said means for operation in accordance with a differential between the currents in the feeders, and a circuit connecting the differential relay to the master relay and the discharge devices to effect operation of the master relay and apply a control voltage to the arc discharge devices to render the arc discharge devices conductive.

4. In a circuit breaker system, a circuit breaker connecting each of an incoming feeder and outgoing feeders to a common bus, each of said circuit breakers having a trip device for effecting tripping thereof, a high speed trip circuit including a hot cathode gaseous discharge device connecting each trip device directly to a source of electrical energy, a common master relay connecting the trip devices to a source of electrical energy simultaneously, a protective relay operable to connect the master trip relay to the source of electrical energy to effect operation thereof and simultaneously apply a voltage therefrom to the discharge devices to render them conductive, and circuit means including a current transformer associated with each feeder and with the protective relay connected to effect operation of the protective relay in response to a differential between the current in the incoming feeder and the sum of the currents in the outgoing feeders.

5. In a control system, a plurality of circuit breakers connecting incoming and outgoing feeders to a bus, each of said breakers having a trip device with a trip coil energizable to trip its breaker, a high speed tripping circuit for each breaker including a hot cathode gaseous discharge device connected directly in circuit with each trip coil to effect energization of its trip coil, a master relay, circuit means connecting the master relay to effect energization of all of said trip coils simultaneously, a protective relay, circuit means connected to simultaneously effect energization of the master relay and apply a control voltage to the discharge devices to render them conductive, additional circuit means including current transformers connected in circuit with the feeders and the protective relay to operate said relay in response to a differential between the current of the incoming feeder and the current of the outgoing feeders, and contact means operable in accordance with the position of the breakers connected in circuit with the trip coils to interrupt the energizing circuits of the trip coils whenever the associated breaker opens.

6. In a control system, a plurality of circuit breakers connecting incoming and outgoing feeder to a bus, each of said circuit breakers having a trip device with a trip coil energizable to open its breaker, a high speed trip circuit for each trip device including a hot cathode gaseous discharge device connecting the trip coil directly to a source of electrical energy and having a control electrode, a master relay having contacts, a circuit including said contacts connecting each trip coil to a source of electrical energy, a protective relay having contacts, circuits including said protective relay contacts connected to effect energization of the master relay and to connect the control electrodes to a source of positive bias to render the discharge devices conductive, circuit means including a current transformer associated with each feeder and connected in circuit to effect operation of the protective relay in response to a differential between the currents of the incoming and outgoing feeders, an overcurrent relay for each feeder operable to connect the trip coil of the associated breaker to a source of electrical energy, and contacts operable in response to opening of each circuit breaker to disconnect its trip coil from the source.

7. A circuit breaker system comprising a circuit breaker having a trip device for effecting tripping thereof, means including a thyratron connecting the trip device to a source of control voltage, a fault responsive relay, a circuit connecting the fault responsive relay to apply a control voltage to the thyratron to make the thyratron conductive, a control relay having contacts, a circuit connecting the control relay and fault responsive relay to make the former operable in response to operation of the fault relay, circuit means connecting the trip device to the source of control voltage including a contact of the control relay, and auxiliary circuit breaker contact means operable with the circuit breaker connected in series with the trip device to interrupt the connection thereof to the source of control voltage when the breaker opens.

References Cited in the file of this patent

UNITED STATES PATENTS

| | | |
|---|---|---|
| 1,715,684 | Thomas | June 4, 1929 |
| 1,760,541 | Bruckel | May 27, 1930 |
| 1,906,817 | Seeley | May 2, 1933 |
| 2,008,409 | Wensley | July 16, 1935 |
| 2,089,719 | Traver | Aug. 10, 1937 |
| 2,235,402 | Harder | Mar. 18, 1941 |
| 2,242,950 | Harder | May 20, 1941 |
| 2,372,134 | Steeb | Mar. 20, 1945 |
| 2,374,054 | Travers et al. | Apr. 17, 1945 |
| 2,381,254 | Bonine | Aug. 7, 1945 |
| 2,441,789 | Bivens | May 18, 1948 |